(12) United States Patent
Edwards et al.

(10) Patent No.: US 7,145,268 B2
(45) Date of Patent: Dec. 5, 2006

(54) FAULT-TOLERANT THREE-LEVEL INVERTER

(75) Inventors: John Edwards, Kent, WA (US); Longya Xu, Columbus, OH (US); Brij B. Bhargava, Santa Barbara, CA (US)

(73) Assignee: The Boeing Company, Chicago, IL (US)

( * ) Notice: Subject to any disclaimer, the term of this patent is extended or adjusted under 35 U.S.C. 154(b) by 348 days.

(21) Appl. No.: 10/335,683

(22) Filed: Dec. 31, 2002

(65) Prior Publication Data

US 2004/0125523 A1    Jul. 1, 2004

(51) Int. Cl.
*H02B 1/24* (2006.01)

(52) U.S. Cl. .................................. 307/127

(58) Field of Classification Search ................. 307/127
See application file for complete search history.

(56) References Cited

U.S. PATENT DOCUMENTS

| | | | | |
|---|---|---|---|---|
| 3,750,004 | A * | 7/1973 | Walker | 363/58 |
| 3,775,662 | A * | 11/1973 | Compoly | 363/43 |
| 4,527,226 | A * | 7/1985 | Glennon | 363/41 |
| 4,916,598 | A * | 4/1990 | Takase et al. | 363/55 |
| 6,337,804 | B1 * | 1/2002 | Kea et al. | 363/132 |

OTHER PUBLICATIONS

T. Jahns, Interior Permanent-Magnet Synchronous Motors for Adjustable-Speed Drives, IEEE Tans. Industrial Applications, vol. IA-22, No. 4, pp. 738-747, Jul./Aug. 1986.

J.W. Choi, S.K. Sul, New Current Control Concept—Minimum Time Current Control in the Three-Phase PWM Converter, IEEE Transactions on Power Electronics, vol. 12, No. 1, pp. 124-131, 1997.

L. Xu, S. Li, A Fast Response Torque Control for Interior Permanent-Magnet Synchronous Motors in Extended Flux-Weakening Operation Regime, International Elctric Machine and Drive Conference, Cambridge, Massachusetts, Jun. 17-21, 2001.

L. Xu, S. Li, Torque Control Patching and Anti-Windup and Bump-less Transfer Conditioning of Current Regulators for High-Speed PMSM Systems, 32nd IEEE Power Electronics Specialist Conference, Vancouver, Jun. 17-22, 2001.

Alain Chabod et al., Flywheel Energy Storage for Quality Power in the Semiconductor Production Industry, 8 pgs., AP-MKT-WPST-001 (May 4, 2002).

Bradley S. Walter, High Reliability Battery-Free Power Quality Solutions for Large Internet Data Centers, AP-MKT-WPDC-001 (May 4, 2002).

* cited by examiner

*Primary Examiner*—Brian Sircus
*Assistant Examiner*—Dru Parries
(74) *Attorney, Agent, or Firm*—Lee & Hayes, PLLC

(57) ABSTRACT

A method for driving a neutral point clamped three-level inverter is provided. In one exemplary embodiment, DC current is received at a neutral point-clamped three-level inverter. The inverter has a plurality of nodes including first, second and third output nodes. The inverter also has a plurality of switches. Faults are checked for in the inverter and predetermined switches are automatically activated responsive to a detected fault such that three-phase electrical power is provided at the output nodes.

17 Claims, 8 Drawing Sheets

US 7,145,268 B2

FAULT-TOLERANT THREE-LEVEL INVERTER

STATEMENT OF GOVERNMENT INTEREST

This invention was made with government support under contract number DE-FC36-99-GO-10285 awarded by the Department of Energy. The U.S. Government has certain rights in this invention.

FIELD OF THE INVENTION

This invention relates generally to power conversion and, more specifically, to three-level inverter modulation.

BACKGROUND OF THE INVENTION

Inverters are utilized in AC motor drive, utility interface, and an uninterruptible power supply ("UPS") applications as a means for converting DC to AC electrical power. A traditional inverter generates a low frequency output voltage with controllable magnitude and frequency by programming high-frequency voltage pulses. The high frequency voltage pulses open and close switches to expose a load to pulses of DC current. An inverter of this type is said to be using pulse width modulation ("PWM"). Timing, duration, and voltage of the pulses simulate the peaks and troughs of traditional sinusoidal alternating current. Where the load has an inherent inductive nature, such as windings of a motor, the pulses approximate the sinusoid without significant high frequency harmonics.

To handle larger and larger input voltages, larger switching transformers are needed. Where silicon fabrication has not kept up with the need for greater power, a three-level inverter topology has arisen. The topology equally divides two input voltage sources, thereby allowing twice the total voltage at the output for the same capacity transistor. The inverter was further refined for applications that do not have divided input voltage sources to have instead a series connected capacitor bank defining a neutral point-clamped three-level inverter.

The three-level inverter is one of the most popular topologies for three-phase multi-level voltage source inversion. The advantages of the three-level inverter are:

1) Because of the redundancy of the switches, voltage across any one switch is only half of the DC bus voltage;

2) Switching losses are cut in half due to the reduced harmonics present in the output wave forms for the same switching frequency; and 3) The power rating increases.

The literature recognizes certain drawbacks, as well, in the three-level inverter. Such inverters require complex control circuitry, each of the redundant switches add to the price of the inverter, and the charge at the mid-point between the two DC linking capacitors can accumulate when switching is not balanced.

In many applications, including for example, energy storage flywheels coupled to synchronous motors, failure of the inverter will cause the driving motor to impart an unequal torque to the flywheel. Such unequal torque, especially at very high revolution rates, might be catastrophic to the flywheel. However, the inverters will only work as long as the switching components within them will work.

The three-level topography is configured to allow current to pass through two distinct switching paths for each activation state. In every instance there is a "best" solution and a second "better" solution. Because of this inherent redundancy and because of the strength of the switching products the three-level topography of the three-level inverter has inherent redundancies that will allow it to be used, if properly driven, for a fault-proof inverter. However, without a driver that will quickly recognize a fault, in turn, disabling one of two switching paths, diverting current only through valid switches at appropriate voltages, the redundancy of the design is not exploited. The fault-caused imbalances can easily upset the driven load.

There is, thus, an unmet need in the art for a method and a device for driving a fault-tolerant three-level inverter.

SUMMARY OF THE INVENTION

A method for driving a neutral point clamped three-level inverter is provided. In one exemplary embodiment, DC current is received at a neutral point-clamped three-level inverter. The inverter has a plurality of nodes including first, second and third output nodes. The inverter also has a plurality of switches. Faults are checked for in the inverter and predetermined switches are automatically activated responsive to a detected fault such that three-phase electrical power is provided at the output nodes.

The present invention exploits inherent redundancy in a three-phase inverter. Upon detecting a faulty switch in the inverter, a driver activates predetermined switches whose vector sum has a same resultant phase angle as the switches they replace. By selecting the predetermined switches, the resulting phase angles are the same as in the unfaulted operation though the magnitude may be diminished according to rules of vector addition.

BRIEF DESCRIPTION OF THE DRAWINGS

The preferred and alternative embodiments of the present invention are described in detail below with reference to the following drawings.

DETAILED DESCRIPTION OF THE INVENTION

By way of overview, a method for driving a neutral point clamped three-level inverter is provided. In one exemplary embodiment, DC current is received at a neutral point-clamped three-level inverter. The inverter has a plurality of nodes including first, second and third output nodes. The inverter also has a plurality of switches. Faults are checked for in the inverter and predetermined switches are automatically activated responsive to a detected fault such that three-phase electrical power is provided at the output nodes.

Figure 1:
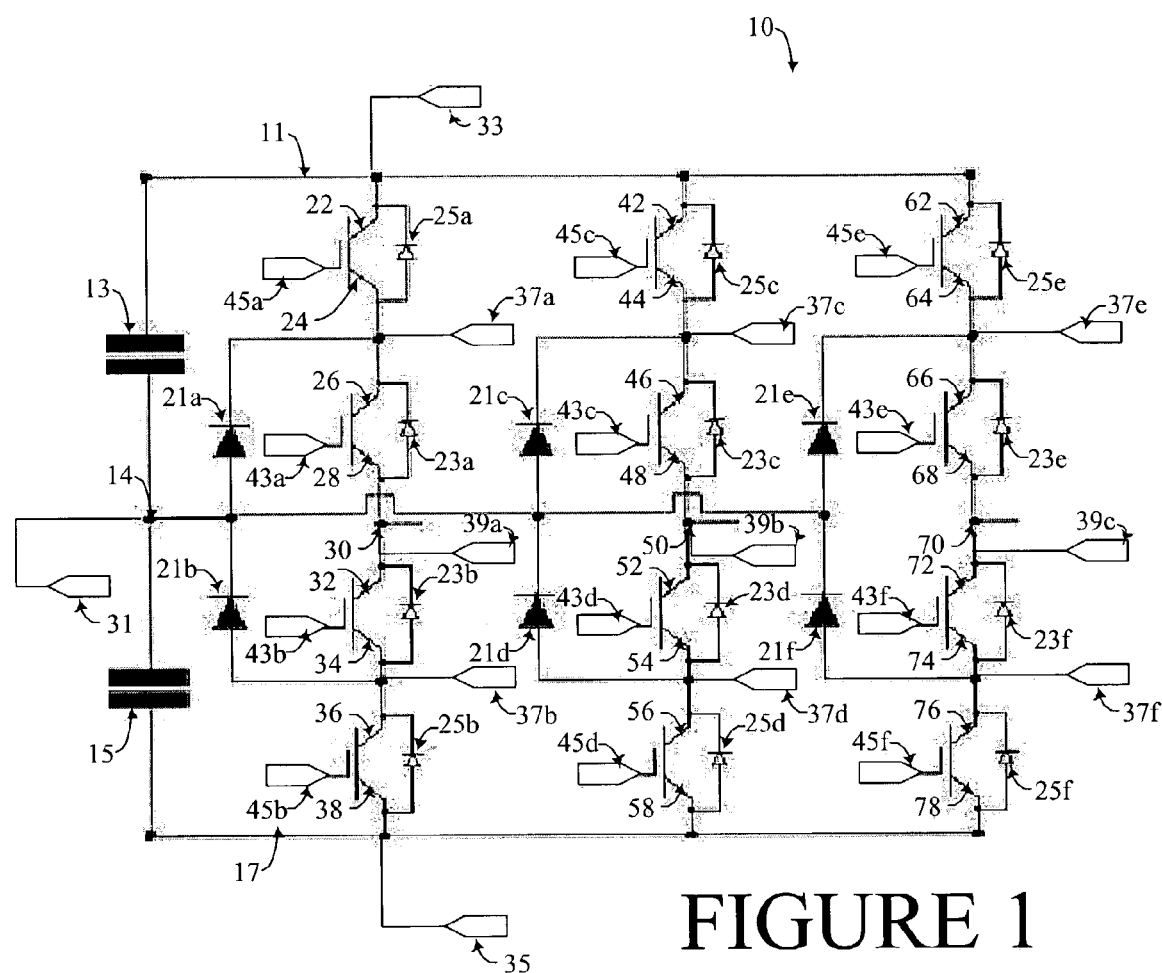
FIG. 1 is a three-level inverter with sensors and drivers depicted.

Referring to FIG. 1 DC linking capacitors 13 and 15 are connected in series and separate a positive DC bus node 11 from a negative DC bus node 17. The capacitors 13 and 15 define a neutral point 14 between the capacitors 13 and 15 that is capable of accepting and storing either positive or negative charge. The neutral point 14 allows the inverter to treat the DC bus nodes 11 and 17 as though there were two equal DC sources connected in series defining three power nodes: a positive node 13, a neutral node 14, and a negative node 15. Three voltage sensors 31, 33, and 35 monitor health status of switches and diodes in the inverter 10, and convey the monitored status to a driver. The sensor 33 senses voltage on the positive node 11 side of the DC linking capacitor 13. Sensor 31 reports the charge stored at the neutral point 14 node between the DC linking capacitors 13 and 15. Finally, the sensor 35 senses the potential stored on the negative node 17 side of the DC linking capacitor 15.

A phase circuit 20 for Phase (Φ) A, a phase circuit 40 for Φ B, and a phase circuit 60 for Φ C are connected in parallel with each other. Each of the phase circuits 20, 40, and 60 are electrically connected to the positive node 11, the neutral point 14, and the negative node 17.

The phase circuit 20 includes a switch 45a with a drain terminal 22 and a source terminal 24. The drain terminal 22 is connected to the positive node 11. A clamping diode 25a is connected across the drain terminal 22 and the source terminal 24. The source terminal 24 is connected to a drain terminal 26 and the source terminal 28. A clamping diode 21a is connected between the neutral point 14 and the drain terminal 26. The source terminal 28 is connected at an output node 30 to a drain terminal 32 of a switch 43b that also has a source terminal 34. A sensor 39a is also connected to the output node 30. A clamping diode 23b is connected across the drain terminal 34. A clamping diode 21b is connected between the neutral point 14 and the source terminal 34. The source terminal 34 is connected to the drain terminal 36 of a switch 45b that also has a source terminal 38 that is connected to the negative node 17. A clamping diode 25b and across the drain terminal 36 and the source terminal 38. The clamping diodes 21a, 23a, and 25a maintain voltage across the switches 43a and 45a within a voltage of the capacitor 13. The clamping diode's 21b, 23b, and 25b maintain fold state across the switches 43b and 45b within a voltage of the capacitor 15

The phase circuit 40 includes a switch 45c with a drain terminal 42 and a source terminal 44. The drain terminal 42 is connected to the positive node 11. A clamping diode 25c is connected across the drain terminal 42 and the source terminal 44. The source terminal 44 is connected to a drain terminal 46 and the source terminal 48. A clamping diode 21c is connected between the neutral point 14 and the drain terminal 46. The source terminal 48 is connected at an output node 50 to a drain terminal 52 of a switch 43d that also has a source terminal 54. A sensor 39b is also connected to the output node 50. A clamping diode 23d is connected across the drain terminal 54. A clamping diode 21d is connected between the neutral point 14 and the source terminal 54. The source terminal 54 is connected to the drain terminal 56 of a switch 45d that also has a source terminal 58 that is connected to the negative node 17. A clamping diode 25d and across the drain terminal 56 and the source terminal 58. The clamping diodes 21c, 23c, and 25c maintain voltage across the switches 43c and 45c within a voltage of the capacitor 13. The clamping diode's 21d, 23d, and 25d maintain fold state across the switches 43d and 45d within a voltage of the capacitor 15

The phase circuit 60 includes a switch 45e with a drain terminal 62 and a source terminal 64. The drain terminal 62 is connected to the positive node 11. A clamping diode 25e is connected across the drain terminal 62 and the source terminal 64. The source terminal 64 is connected to a drain terminal 66 and the source terminal 68. A clamping diode 21e is connected between the neutral point 14 and the drain terminal 66. The source terminal 68 is connected at an output node 70 to a drain terminal 72 of a switch 43f that also has a source terminal 74. A sensor 39f is also connected to the output node 70. A clamping diode 23f is connected across the drain terminal 74. A clamping diode 21f is connected between the neutral point 14 and the source terminal 74. The source terminal 74 is connected to the drain terminal 76 of a switch 45f that also has a source terminal 78 that is connected to the negative node 17. A clamping diode 25f and across the drain terminal 76 and the source terminal 78. The clamping diodes 21e, 23e, and 25e maintain voltage across the switches 43e and 45e within a voltage of the capacitor 13. The clamping diode's 21f, 23f, and 25f maintain fold state across the switches 43f and 45f within a voltage of the capacitor 15

Figure 2:
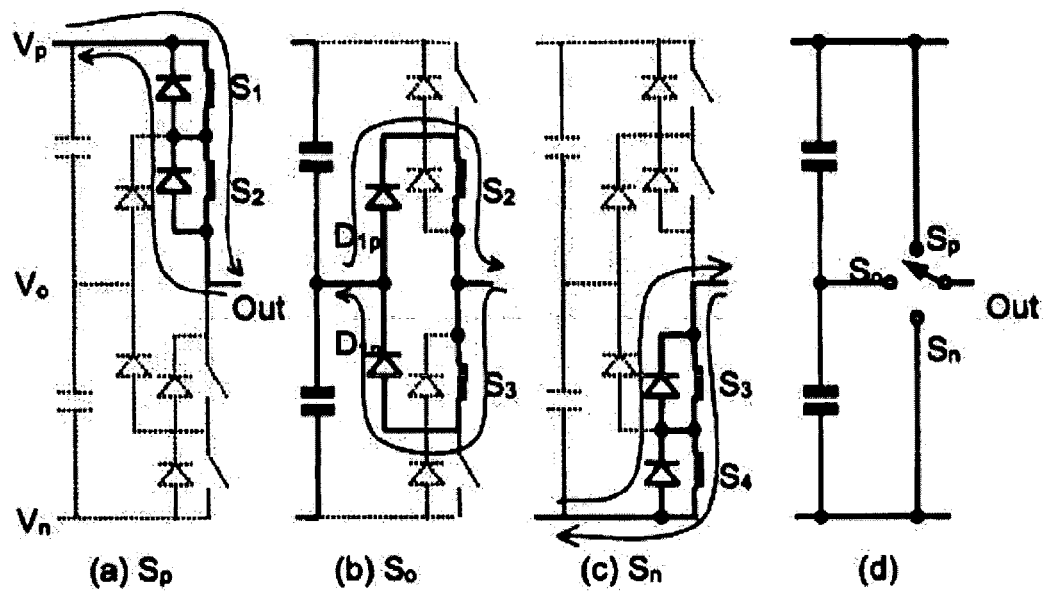
FIG. 2 is a schematic of a phase of the inverter showing the switching functions of the driver circuitry.

Referring now to FIGS. 1 and 2 together, the inverter 10 operation as follows. Subpanes (a), (b), (c), and (d) as representing any of the output phases of the inverter. For example, the output phase A, switch S1 is the switch 45a, switch S2 is the switch 43a, switch S3 is the switch 43b and the switch S4 is the switch 45b. The same convention applies to any of the three phases.

In subpane (a), arrows indicate two current paths that exist between the positive node 11 represented by the voltage $V_p$ to the output node 30 either through the clamping diodes or through the switches S1 and S2. In subpane (b), arrows represent the two current paths between the neutral point 14 that connect the voltage $V_O$ and the output node 30 upon activation of the switches S2 and S3. Subpane (c) shows two resulting paths between the negative node and the voltage $V_n$ at the node 17 and the output node 30 upon activation of switches $S_3$ and $S_4$. As a result, subpane (d) shows an equivalent construction for this single output phase A of the inverter. Subpane (d) shows the output node 30 as a common terminal of a rotary switch allowing switching between the terminal $S_P$ providing a current path to the positive node 11, terminal $S_O$ providing a current path to the neutral point 14, and terminal $S_n$ providing a current path to the negative point 17.

The convention set forth in FIG. 2(d) suggests an advantageous means of conveying a state of the inverter 10. If the voltage applied to a synchronous three-phase motor is considered as though the motor were connected in delta, voltages to drive the motor are suitably the potential differences between the output nodes. A tri-axial graph where each voltage difference between terminals defines each of the three axes of a tri-axial graph. The voltage difference between the output nodes 50 and 70 as being the vertical axis; leaving the voltage difference between the output nodes 70 and 30 and the voltage difference between the output nodes 30 and 50 as the two remaining axes. Carrying this convention further, a situation where each of the output phases A, B, and C corresponds to each of the subpanes (a), (b), and (c) of FIG. 2. Thus phase A has the switches S1 and S2 activated providing a current path between the positive node 11 and the output node 30, phase B has switches S2 and S3 activated thereby providing a direct current path between the neutral point 14 and the output node 50, and phase C has switches S3 and S4 activated providing a direct line between the output node 70 and the negative node 17.

If the voltage difference between the positive 11 and negative 17 nodes is $V_S$ or source voltage, then the difference between the output nodes at 30 and 50 and 50 and 70 are both suitably one-half of the source voltage represents the difference between the mid-point and each of the extreme nodes 11, 17.

Figure 3:
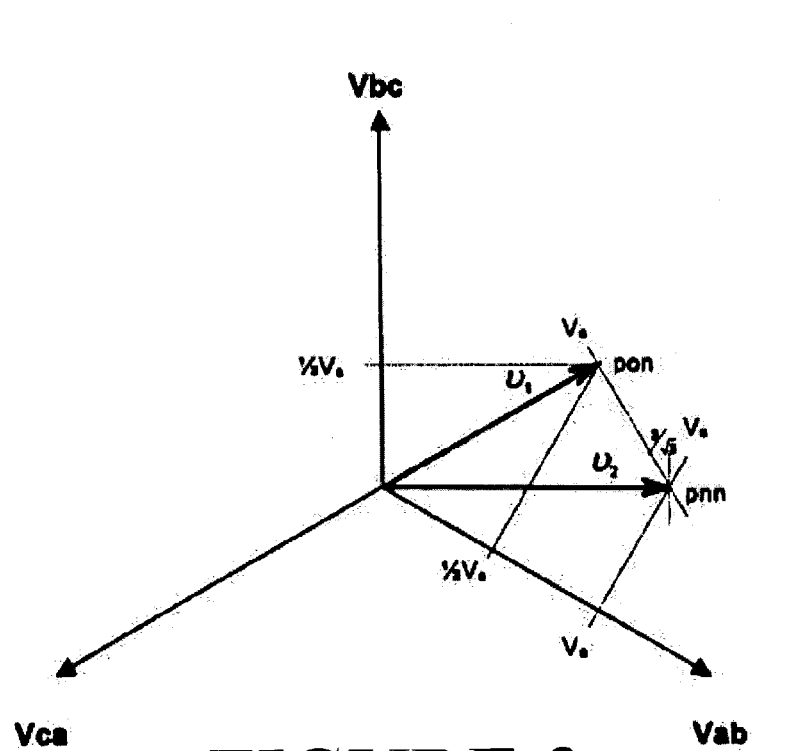
FIG. 3 is a vector depiction of the phase angle mathematics of various switching options of a three-level inverter.

In FIG. 3, the suitably relationship between the voltages is shown by the voltage on the $V_{bc}$ axis being one-half of the source voltage and the voltage on the $V_{ab}$ axis also being one-half of the source voltage. Thus vector $V_1$ represents the switching state of the phases in sequence being positive-neutral-negative. In a convenient shorthand this is represented p0n as shown at an arrowhead of the vector $V_1$. If, as a second example, phase A connects the output node to the positive node 11 and both phases B and C connect to the negative node 17, the convention is suitably pnn. In voltage terms this means $V_{ab}$ represents the full source voltage, i.e., the difference between the positive and negative nodes. $V_{ca}$ is suitably equal to the negative of the source voltage. $V_{bc}$ is suitably equal to zero. Therefore, the resulting vector is $V_2$ with an annotation pnn at its arrowhead.

Figure 4:
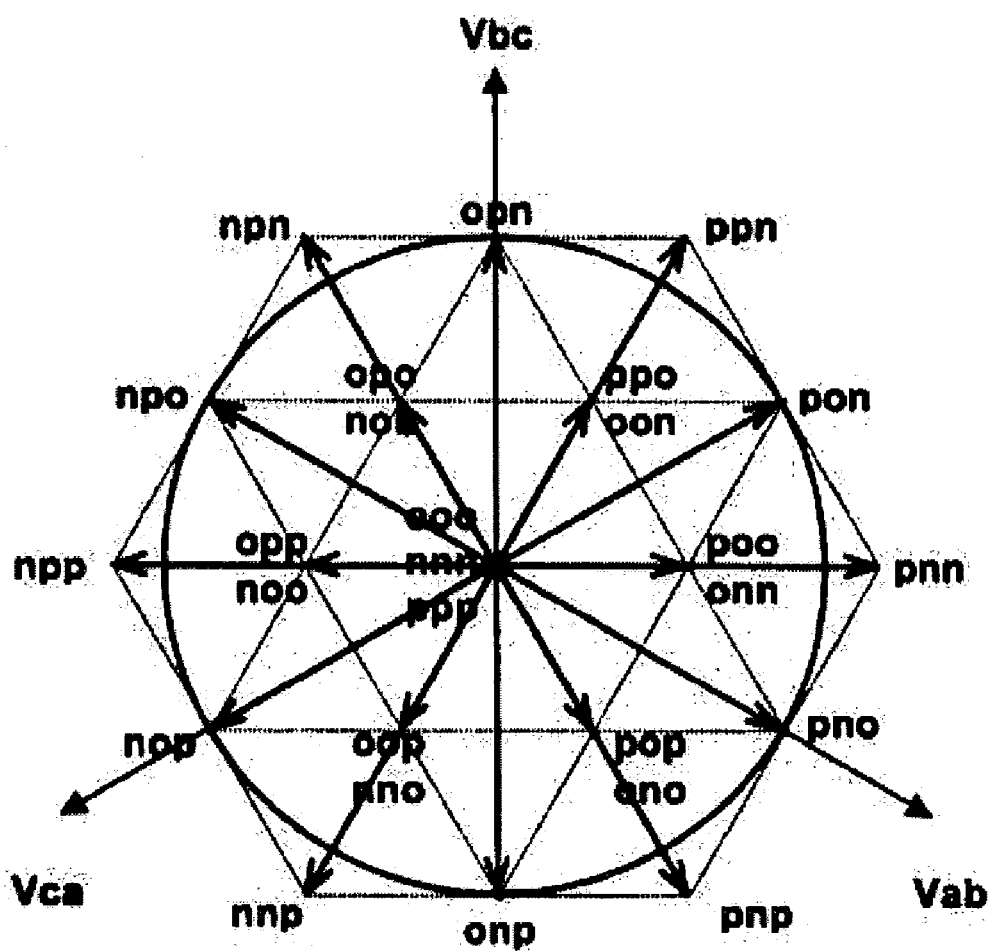
FIG. 4 shows a hexagonal geography resulting from the phase angle mathematics.

Using this same convention, a hexagonal representation of a full cycle of the inverter 10 is shown in FIG. 4. Eighteen possible vectors result from twenty-seven possible switch combinations. It will be appreciated that six main vectors define the six states of the switches where only the positive 11 or negative 17 nodes are implicated. Starting from the $V_{bc}$ axis and listing from the clockwise direction, the six main vectors are ppn, pnn, pnp, nnp, npp, npn. These six vectors defining the major axis of the hexagon are the "large vectors." Six medium vectors introduce the moderating influence of the neutral point 14, and represent vectors to the midpoints of these sides of the defined hexagon. These "medium vectors" begin from the axis $V_{bc}$, include switching combinations are 0pn, p0n, pn0, 0np, n0p, np0. Small vectors are aligned with the six major vectors and are generated where two of the switching paths are directed to the neutral point or to this same extreme node. Because there exist two equivalent ways to generate a same vector, these small vectors are suitably represented as ordered pairs (pp0, 00n), (p00, 0nn), (p0p, nn0), (00p, nn0), (0pp, n00), and (0p0, n0n). Finally, there exists three zero vectors which are the result of all switches leading to the same node. These zero vectors are ppp, 000, and nnn.

In order to generate three-phase power to drive a synchronous motor the switching state jumps alternately from large vector to medium vector and back to large vector as the state of the inverter 10 moves one switch at a time in the counter-clockwise direction around the hexagon portrayed in FIG. 4. Assuming a starting point at the $V_{bc}$ axis where the switching state is 0pn, the first phase moves to the negative for a resulting npn the third phase then moves to the neutral point for a resulting state np0 and the third phase then moves to the positive node for an npp state. The inverter continues in a similar fashion all the way around the hexagon, thereby defining a rough sinusoid at each of the phase output nodes.

Figure 5:
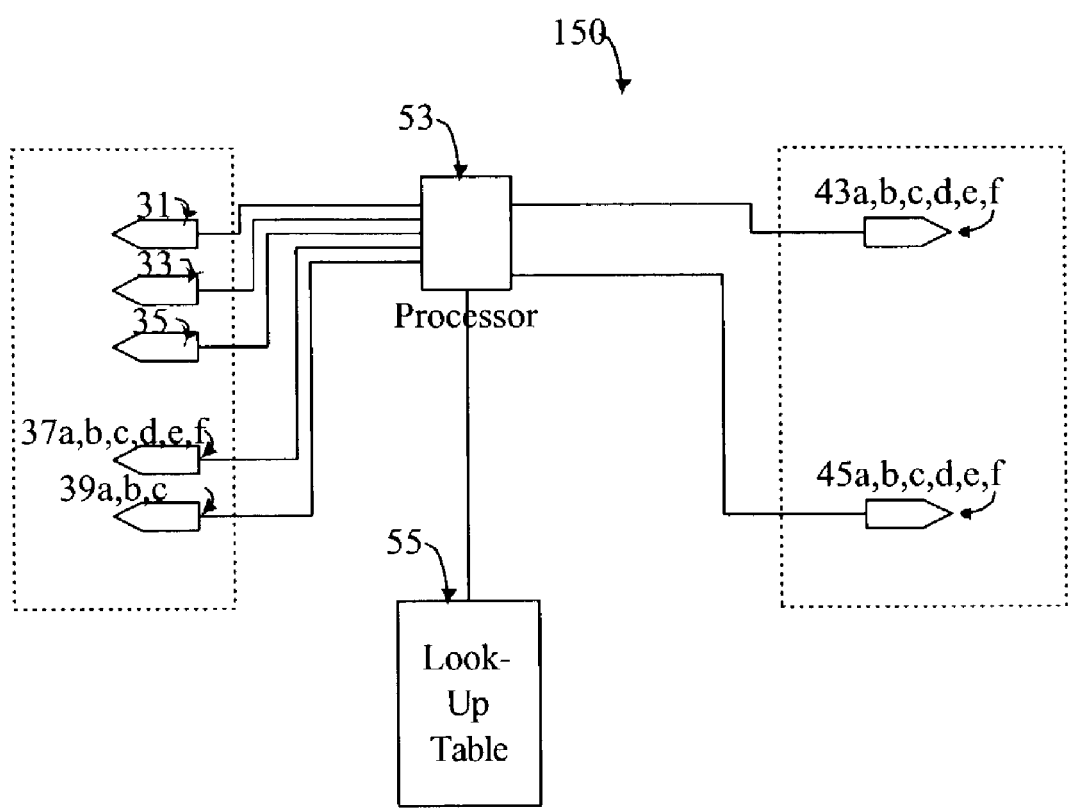
FIG. 5 is a block diagram of components of a driver circuit.

In order to effect the rotation around the hexagon portrayed in FIG. 4 the inverter is driven by an exemplary driver circuitry 150 as portrayed in FIG. 5. Referring to FIGS. 1 and 5, FIG. 5 shows a of a block diagram of the inverter 10, specifically the driver 150 for the inverter 10. The central element in the driver 150 is the processor 53. Connected to the processor are the gate leads for the inboard transistors 43a, b, c, d, e, and f and the gate leaves for the outboard transistors, 45a, b, c, d, e, and f. Though the block diagram shows the leads as a pair of single blocks, each of the leads, for example 45c triggers independently at the command of the processor 53. Also connected to the processor 53 are number of voltage sensors for the positive, neutral, and negative nodes, 31, 33, 35 and the voltage sensors across the switches, 37a, b, c, d, e, and f, as well as the output voltage sensors for phases A, B, and C respectively 39a, b, and c. Each of the voltage sensors present the instantaneous readings of the voltage to the processor 53.

Finally, the processor 53 is connected to a look up table 55 containing switching combinations capable of producing appropriate voltage vectors. Within a look up table 55, there are prestored each of the switching strategies necessary to react to a fault across any of the switches or diodes. Thus, for example, in the event of the detected switching fault across switch 45b, the look up table contains appropriate strategies to rotate the phase of the inverter 10 through the cycle without relying upon switch 45b.

The present invention advantageously sensing voltages at various nodes within the inverter. While several configurations of sensors suitably alert the processor 53 of faults that may exist, the presently preferred embodiment portrayed in FIGS. 1 and 5 places the sensors into three groups. The first group represents the two voltage source nodes 11 and 17 and the neutral point 14. The sensor 31 is connected to the neutral point 14 between capacitors 13 and 15. Sensor 33 is attached to the positive node 11 and sensor 35 is attached to the negative node 17.

The sensors at 39a, b, and c sense either the current or the voltage or both at the output nodes for each of the three phases A, B and C respectively. Alternate embodiments may use sensors situated to sense current into or out of a node such that Kirchoff's first law might be used to determine the state of the switches and diodes that make up the inverter but in this embodiment voltage sensors are used. In a presently preferred embodiment all of the sensors shown in FIG. 5, i.e., 31, 33, 35, 37(a), 37(b), 37(c), 37(d), 37(e), and 37(f), 39(a), 39(b) and 39(c), will all be voltage sensors.

For the sake of clarity, this discussion of faults will be confined to faults occurring in phase A. One skilled in the art can see that because phase A is repeated identically in phases B and C no additional information would be garnered from an additional discussion of either phase B or C. Additionally, there are only three types of failure that might occur in each phase. Case One is the failure of an outboard power transistor. Outboard power transistors are defined as those transistors connected to either the positive node 11 or the negative node 17. In FIG. 1 for phase A, the outboard power transistors are 45(a) and 45(b). Case Two is the failure of the inboard power transistors 43(a) or 43(b). Inboard power transistors are power transistors connected to the neutral point 14. Finally, Case Three is the failure of the clamping diode, in the case of phase A, the short circuit-failure of either of clamping diodes 21(a) or 21(b).

Figure 6A:
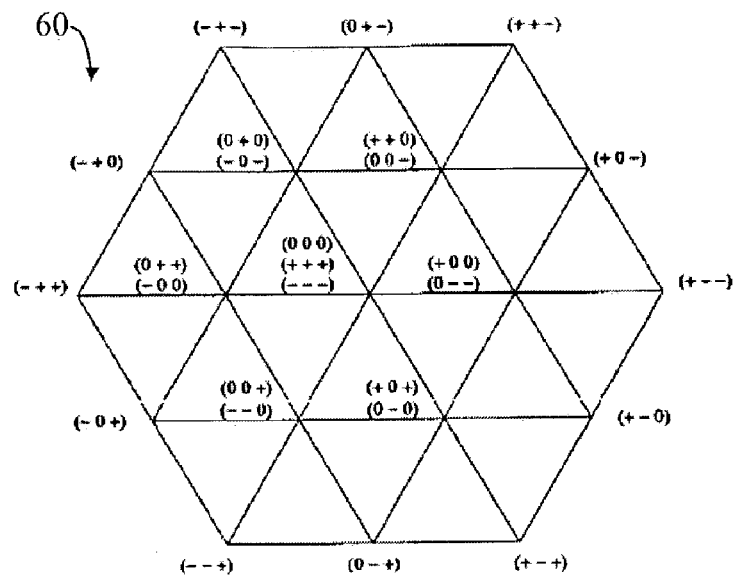
FIG. 6a is a vector representation of switching paths through the three-level voltage inverter.
Figure 6B:
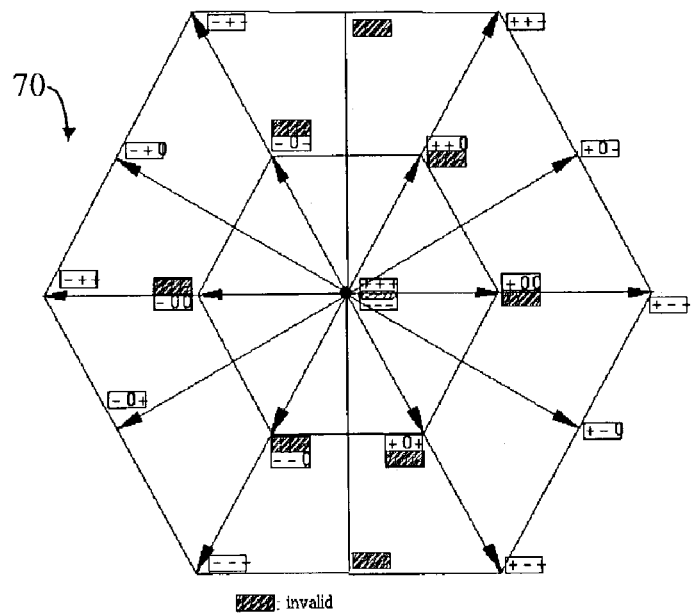
FIG. 6b is a vector representation of the three-level inverter in which one of the outboard power transistors has failed.

FIGS. 6a, 6b and 6c, and 6d respectively show the healthy switching network and each of these three faulty cases as they map out on the hexagon. FIG. 6b, for example, shows Case One where the hexagon 70 with one of the outboard power transistors 45(a) or 45(b) short-circuited. Hatched boxes show the resulting invalid states.

FIGS. 6a, 6b, 6c, and 6d, depart slightly from earlier nomenclature. In FIGS. 6a, 6b, 6c, and 6d, states for the phases are now indicated by their algebraic signs rather than by abbreviation. Thus a plus sign (+) is substituted for p, and the minus sign (−) is substituted for n and the zero remains for the neutral state. Thus, where a system state for the inverter 10 indicates that a particular switch should be open and voltage sensors on either side of the switch indicate equal voltage, then the transistor or switch is presumed by the processor 53 to be faulty or short-circuited.

Figure 6C:
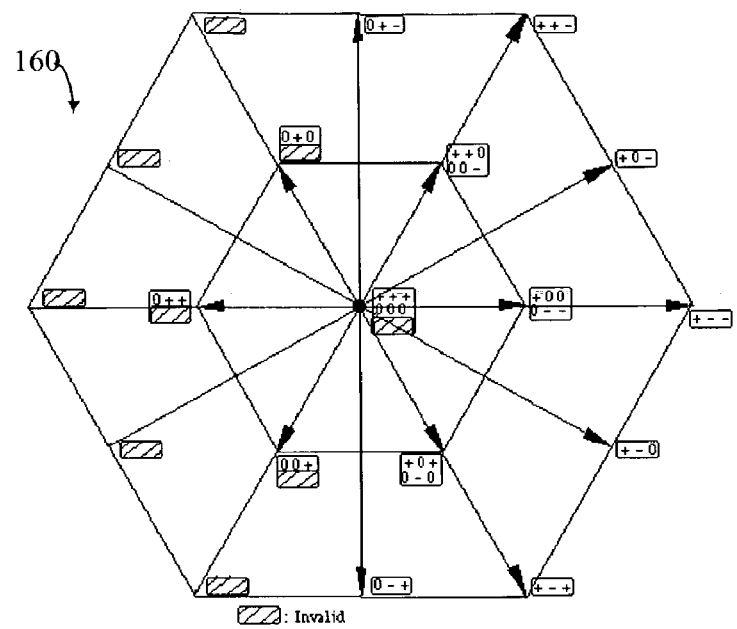
FIG. 6c is a vector representation of the three-level inverter where one of the inboard power transistors has failed.
Figure 6D:
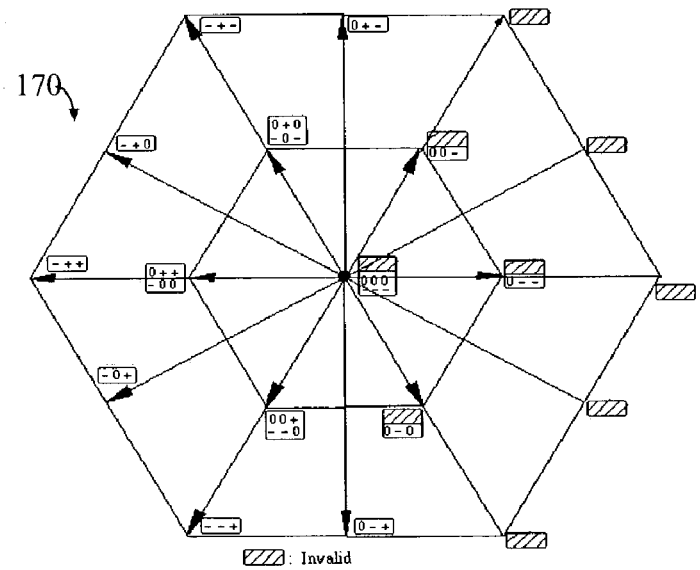
FIG. 6d is the vector representation of the three-level inverter where one of the clamping diodes has failed

FIG. 6c indicates a hexagon 160 for Case Two, where the inboard power transistors 43(*a*) and 43(*b*) have short-circuited. Here, too, the convention is to place a hatched box where an invalid system state exists because of the failure of the switch. Finally, FIG. 6d indicates the hexagon 90 where Case Three is true; that is to say that the clamping diode either 21(*a*) or 21(*b*) has short-circuited. In each of these three cases, a generalized truth about the states can be observed. In the hexagons 70, 160 and 170, there always exists at least one switching combination to define one of the small vectors lying along the same phase angel as the large vectors. Thus, while the output of the source inverter 10 might be one-half of its normal peak-to-peak output the source inverter 10 can define a usable driving power all the way around the hexagon using the remaining valid switching combinations for each of the small vectors. Based upon which component failed, the processor 53 can determine the appropriate vectors for fault tolerant operation simply by knowing which vectors remain for selection. In this preferred embodiment, rather than work through algorithms, the appropriate vectors are stored in a look-up table 55 (FIG. 5).

Figure 7:
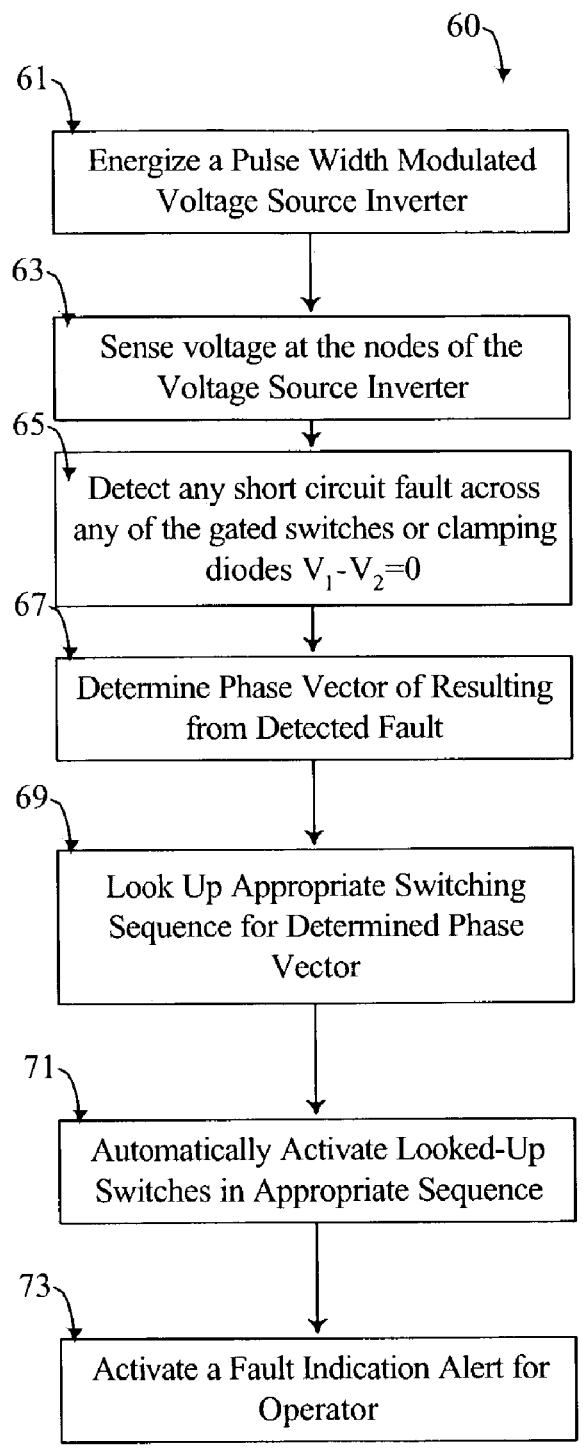
FIG. 7 is a flow chart of a method of driving the inverter.

FIG. 7 portrays a flow chart 60 of the method of driving the three-level inverter. At a block 61, the method requires receiving a DC voltage at the two input terminals of a three-level inverter. At a block 63, the driver senses the voltages at the internal nodes of the inverter, thereby testing the efficacy of the several driven switches and diodes that make up the inverter. The driver continues to monitor these voltages in course of regular operation of the inverter in order to detect any operating fault that might occur.

At a block 65, when such a fault does occur, it is detected by the fact that the voltage across the terminals of either a diode or a switch remains at zero in a quarter-cycle of operation. In some embodiments, such as with Semikron IGBT drivers, the transistor has a built-in short-circuit detector. At a block 67, the phase vector of the fault is determined. At a block 69, according to the determined phase vector of the fault, the remaining switching paths for effecting the rotation of the phase angle of the inverter through the cycle are consequently determined.

At a block 71, the inverter driver synchronously shifts from the normal operation to the activation of the switches determined at the block 69. Because the identity of the faulty switch or diode determines the appropriate switching paths to continue operation in spite of a faulty switch or diode, transition of the driver 150 from detection of a fault under normal operation to fault-tolerant operation is nearly instantaneous. At a block 73, the driver 150 alerts an operator with an appropriate signal.

Figure 8:
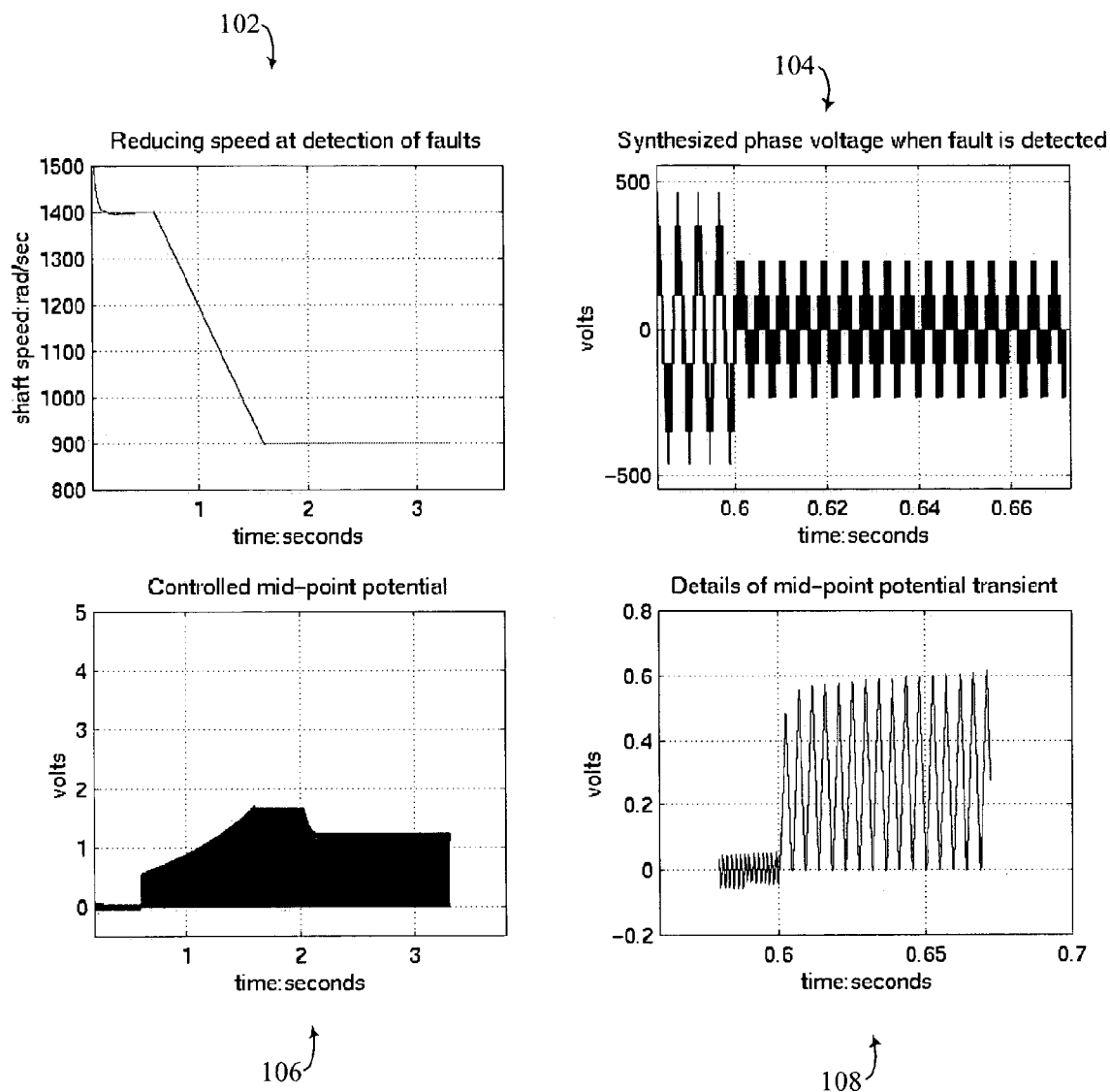
FIG. 8 is a group of four charts of output of the inverter with the driver.

FIG. 8 shows four output graphs of the driver 150 output upon the generating and detecting of a fault within the inverter 10. A table 102 shows an ability to employ regenerative braking using remaining switching vectors to slow a flywheel used for energy storage. The linear response between half a second and 1.5 seconds indicates that the fault tolerant inverter is still effective for applying regenerative breaking. A table 104 shows the predicted result when using the small vectors to generate power. The voltage peaks drop to one-half of the voltage value anticipated using the large vectors.

A graph 106 shows that in spite of using positive and negative node voltages in the neighborhood of plus and minus 500 volts that the deviation in the controlled midpoint potential during the course of breaking and detection is very small. Thus, the storage potential of the neutral point 14 has not been compromised while running the inverter in a faulted mode. Finally, a graph 108 shows the small midpoint charge transients generated during the transition from detecting a fault during normal operation to fault-tolerant operation.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method for driving a neutral point-clamped three-level inverter, the method comprising:

receiving DC current at a neutral point-clamped three-level inverter, the inverter having a plurality of nodes including first, second, and third output nodes, the inverter having a plurality of switches;

checking for faults in the inverter; and automatically activating predetermined switches selected based upon the detected fault and a corresponding voltage vector entry in a look-up table whose vector sum has a same resultant phase angle as the switches they replace and responsive to a detected fault such that three-phase electrical power is provided at the output nodes, wherein automatically activating includes rotating a phase of the inverter through a cycle without relying on a switch with the detected fault.

2. The method of claim 1, wherein checking includes sensing current flowing into the nodes.

3. The method of claim 1, wherein checking includes sensing voltage at each of the nodes.

4. The method of claim 3, wherein checking further includes determining a phase vector resulting from a detected fault.

5. The method of claim 4, wherein automatically activating includes selecting the predetermined switches to compensate for the determined phase vector.

6. A fault-tolerant driver for a neutral point-clamped three-level inverter, the driver comprising:

a plurality of sensors at a plurality of nodes of a neutral point-clamped three-level inverter, the plurality of nodes including first, second, and third output nodes, the inverter having a plurality of switches;

fault detection circuitry configured to detect a fault in the inverter; and means for automatically activating predetermined switches to replace one or more faulty switches, the predetermined switches being selected based upon the detected fault and a corresponding voltage vector entry in a look-up table and responsive to a detected fault such that three-phase electrical power is provided at the output nodes, wherein the processor is configured to activate strategies to rotate the phase of the inverter through a cycle without relying on a switch with the detected fault.

7. The driver of claim 6, wherein the plurality of sensors includes a plurality of current sensors configured to measure current flowing into the plurality of nodes.

8. The driver of claim 6, wherein the plurality of sensors includes a plurality of voltage sensors configured to measure voltage at the nodes.

9. The driver of claim 6, wherein the fault-detection circuitry further includes a processor electrically coupled to receive signals from the sensors.

10. The driver of claim 9, wherein the processor is configured to determine a phase vector resulting from the detected fault.

11. The driver of claim 9, wherein the processor is configured to activate the automatic activating means in response to the detected fault.

12. A fault-tolerant neutral-point-clamped three-level inverter, the inverter comprising:
    a neutral point-clamped three-level inverter, the inverter having a plurality of nodes including first, second, and third output nodes, the inverter having a plurality of switches;
    a plurality of voltage sensors configured to sense voltage at the nodes;
    a processor electrically coupled to the plurality of voltage sensors, the processor configured to detect faults in the inverter; and
    a plurality of gate drivers electrically connected to the processor, the gate drivers being configured to detect faults by comparing sensed voltages to predetermined values stored in a look-up table such that three-phase power is provided at the first, second, and third output nodes wherein the look-up table further includes data to rotate a phase of the inverter through a cycle without relying on a switch with the detected fault.

13. The inverter of claim 12, wherein the processor is configured to activate the gate drivers in response to signals from the voltage sensors.

14. The inverter of claim 12, wherein the processor is configured to detect faults by comparing sensed voltages to the predetermined values stored in the look-up table.

15. The inverter of claim 12, where the processor is configured to drive the gate drivers to activate the predetermined switches according to the sensed voltages and predetermined values in the look-up table.

16. The inverter of claim 12, wherein the processor is configured to calculate a vector having a phase angle and a magnitude representing output voltage presented at the first, second, and third output nodes, the vector being based upon the sensed voltages.

17. The inverter of claim 16, wherein the signal processor is further configured to activate the gate drivers based upon the calculated vector.

* * * * *